United States Patent [19]
Ueda et al.

[11] 3,891,999
[45] July 1, 1975

[54] APPARATUS AND METHOD FOR CONTROLLING WATER WHEEL

[75] Inventors: Tsuneo Ueda; Seiichi Somiya, both of Kawasaki, Japan

[73] Assignee: Fuji Electric Co., Ltd., Kawasaki, Japan

[22] Filed: May 23, 1974

[21] Appl. No.: 472,782

[30] Foreign Application Priority Data

May 23, 1973  Japan.............................. 48-58089

[52] U.S. Cl. ......................... 415/1; 415/20; 415/43
[51] Int. Cl.² ......................................... F01D 17/08
[58] Field of Search .............. 415/1, 17, 29, 30, 20, 415/43

[56] References Cited
UNITED STATES PATENTS

| | | | |
|---|---|---|---|
| 2,283,127 | 5/1942 | Rheingans........................... | 415/20 |
| 2,491,059 | 12/1949 | Ring.................................... | 415/43 |
| 2,727,523 | 12/1955 | Brown................................. | 415/43 |
| 3,063,460 | 11/1962 | Krauss ...............................:. | 415/20 |

Primary Examiner—C. J. Husar
Attorney, Agent, or Firm—Sughrue, Rothwell, Mion, Zinn & Macpeak

[57] ABSTRACT

A method and apparatus for controlling a water wheel is disclosed wherein an auxiliary servomotor having a capacity substantially equal to that of a servomotor for actuating flow control guide vanes is provided for actuating a pressure regulator, the auxiliary servomotor for the pressure regulator and the servomotor for the guide vanes being connected through pipe lines. The pressure regulator and a governor for the water wheel are controlled by the positions of an auxiliary servomotor for the governor and the servomotor for the guide vanes, the guide vanes being otherwise controlled by the difference between the opening position of the pressure regulator and the set position of a load limiter for the water wheel. At the time of free running of the water wheel utilizing the governor, the guide vanes are operated in response to the open-and-closing operation of the pressure regulator to suppress any variation in the water flowing speed in a penstock, and at the time of the load-limiting operation of the water wheel, the pressure regulator is fully closed for minimizing ineffective flow of water.

8 Claims, 1 Drawing Figure

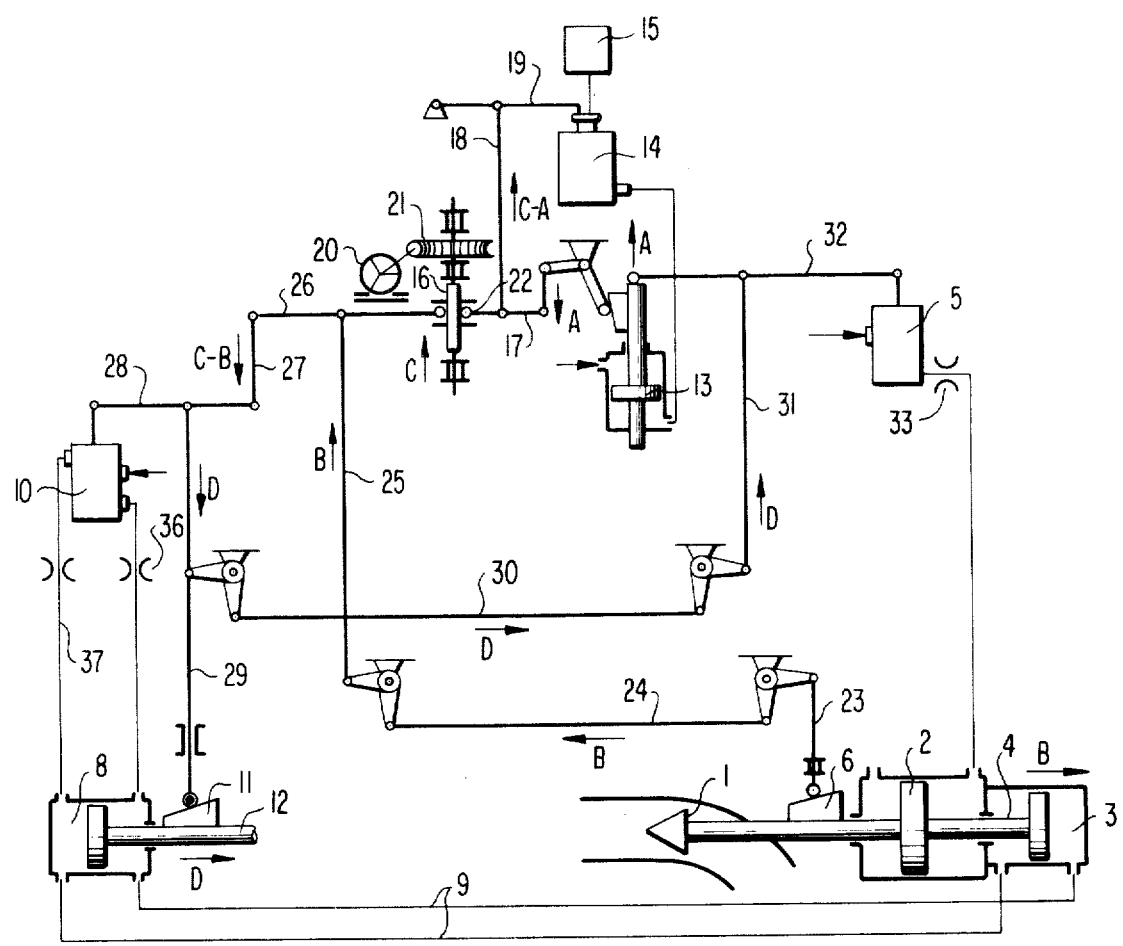

– 3,891,999 –

APPARATUS AND METHOD FOR CONTROLLING WATER WHEEL

BACKGROUND OF THE INVENTION

In a hydroelectric power plant, a penstock is ordinarily provided for introducing a great quantity of pressurized water into the power plant, and the flow of the pressurized water is controlled by the open-and-closing operation of the guide vanes.

In this case, the open-or-closing speed of the guide vanes must be selected extremely carefully, and when the speed is too fast unallowable high pressure or low pressure is created in the penstock due to a water hammering effect. Thus, in the case of a comparatively long penstock, the open-or-closing speed of the guide vanes is selected to be considerably slow. However, such a slow operation of the guide vanes is not advantageous for the governor control of the water wheel, and there exists a possibility of causing unstable operation of the governor or an excessive speed-rise in rotation of the water wheel.

For overcoming the above described difficulty, a pressure regulator has been provided in the power plant, which quickly opens when the guide vanes are required to be closed at a high speed and then gradually closes under the action of a dash-pot. However, the pressure regulator is kept closed when the guide vanes are being opened.

However, the pressure regulator of the conventional arrangement is not free from the possibility of being inoperative at the time the guide vanes are being closed at a high speed due to trouble occurring in the dash-pot or in a pressurized fluid distributing valve for the pressure regulator. This necessitates that the penstock must be designed in consideration of the possibility of being subjected to a high-pressure caused by the inoperation of the pressure regulator, and the merit of providing the pressure regulator is greatly reduced.

For eliminating the above described drawbacks of the known arrangement, there has been made a proposal wherein an auxiliary servomotor having a capacity substantially equal to that of the guide-vane servomotor is further provided for the pressure regulator, the auxiliary servomotor and the guide-vane servomotor being connected through pipe lines, and in the normal operation of the water wheel, the guide vanes are open-or-closed at a slow speed while the pressure regulator is completely closed. But in the case when the guide vanes are required to be closed at a high speed, the pressure regulator is quickly opened, the quick opening of the pressure regulator is transferred to the guide-vane servomotor through the auxiliary servomotor and the pipe lines, so that the guide vanes are closed at a high speed.

According to this proposal, however, the water wheel must always be operated in a load-limiting state, thereby sacrificing the speed-regulating function of the governor. Such features are of course not desirable in the operation of an electrical power network, and the fully loaded operation of the individual power plant is thereby made impossible.

SUMMARY OF THE INVENTION

This invention is directed to overcome all of the difficulties in the conventional devices and proposals. According to this invention, the guide vanes are always closed or opened at a high speed whenever the pressure regulator is quickly opened or closed, whereby not only the construction cost of the hydroelectric power plant is somewhat reduced and the operation thereof is stablized, but also free running of the water wheel under the control of the governor is made possible.

An auxiliary servomotor having a capacity substantially equal to that of a servomotor for guide vanes is provided for a pressure regulator, the auxiliary servomotor for the pressure regulator and the servomotor for the guide vanes are connected through pipe lines, the pressure regulator and a governor for the water wheel are controlled by the positions of an auxiliary servomotor for the governor and the servomotor for the guide vanes, the guide vanes are otherwise controlled by the difference between the opening position of the pressure regulator and the set position of a load limiter for the water wheel, whereby at the time of free running of the water wheel utilizing the governor, the guide vanes are operated in response to the open-and-closing operation of the pressure regulator thereby to suppress any variation in the water flowing speed in a penstock, and at the time of the load-limiting operation of the water wheel, the pressure regulator is fully closed for minimizing ineffective flow of water.

BRIEF DESCRIPTION OF THE DRAWINGS

The FIGURE shows a schematic diagram of the apparatus according to the present invention.

DETAILED DESCRIPTION OF THE INVENTION

The invention will now be described in detail with reference to accompanying drawing.

In the single FIGURE showing an embodiment of the present invention, numeral 1 designates a valve body of the pressure regulator, numeral 2 designates a servomotor for the pressure regulator to operate the valve body 1, and numeral 3 designates an auxiliary servomotor for the pressure regulator. The capacity of the auxiliary servomotor for the pressure regulator is far smaller than that of the pressure regulator servomotor 2, but is substantially equal to the capacity of the guide-vane servomotor hereinafter described. Furthermore, the piston in the pressure regulator servomotor 2 and the piston in the pressure regulator auxiliary servomotor 3 are rigidly connected together. Numeral 5 designates a pressurized fluid distribution valve for the pressure regulator servomotor 2. Numeral 6 is a return cam provided on a rod 7 of the piston in the servomotor 2. Numeral 8 is the guide-vane servomotor for operating the guide vanes (not shown), which is connected through pipe lines 9 to the pressure regulator auxiliary servomotor 3. Numeral 10 designates a main distribution valve for controlling the guide-vane servomotor 8, and numeral 11 is a return cam provided on the piston rod 12 of the guide-vane servomotor 8.

Numeral 13 designates a governor auxiliary servomotor, and numeral 14 designates a primary distribution valve for controlling the governor auxiliary servomotor 13, which valve 14 is controlled from a speed detecting device 15 and a load limiting device 16 through links 17, 18 and 19. The load limiting device 16 is composed of an electric motor 20, a worm gear 21, and a screw-driven nut 22.

The movement of the pressure regulator servomotor 2 is transmitted through the return cam 6 and links 23 through 28 to the main distribution valve 10 for the guide-vane servomotor 8. The movement of the screw-driven nut 22 in the load limiting device 16 is transmitted through links 26 through 28 to the guide-vane main distribution valve 10. Furthermore, the movement of the guide-vane servomotor 8 is transmitted through the return cam 11 and links 29 through 32 to the pressure regulator distribution valve 5. In the drawing, a flow restrictor 33 is provided for determining the open-or-closing speed of the pressure regulator servomotor 2, flow restrictors 36 and 37 are provided for setting the open-or-closing speed of the guide vanes. By these flow restrictors, the open-or-closing period of the guide vanes is set to be more than 10-times of that of the pressure regulator 2, and to be somewhat shorter than the open-or-closing period of the load limiting device 16.

The operation of the water wheel control device according to the present invention will now be described herein below.

Assuming that the movement of the governor auxiliary servomotor 13 is A, the movement of the pressure regulator servomotor 2 is B, the set position of the load limiting device 16 is C, and the movement of the guide-vane servomotor 8 is D, and that the arrow marks associated with these A, B, C and D indicate the directions rendering 100% opening of the respective units, a relation of $A = D$ is maintained because these movements A and D are simultaneously given to the pressurized fluid distributing valve 5 for the pressure regulator servomotor 2. Furthermore, since the difference between the movement C of the load limiting device 16 and the movement B of the pressure regulator servomotor 2, i.e. $(C - B)$, is given to the guide-vane distribution valve 10 as its controlling value, a relation of $D = C - B$ is obtained. This can be rewritten to $B = C - A$ in view of the above described relation $A = D$.

At the time of load-limiting operation of the water wheel, only the movement C of the load limiting device 16 is given to the primary distribution valve 14 for the governor as its commanding amount through the links 17 through 19, so that a relation $C = A$ is obtained. From this relation and the above described relation $B = C - A$, a relation of $B = 0$ is obtained. This means that the pressure regulator is always closed during the load-limiting operation of the water wheel and the wasteful flow of water through the pressure regulator can be thereby prevented. In this operation, any excessive pressure rise in the penstock can be prevented by slow open-or-closing of the load limiting device 16.

At the time of free-running of the water wheel utilizing the governor, if the load limiting device 16 is set at a position C corresponding to a far greater load than that of the expected, only the command from the speed detecting device 15 is given to the primary distribution valve 14 for the governor. Thus the amount A cannot be equal to C, and the pressure regulator 2 quickly opens the valve 1 for discharging water of an amount corresponding to $C - A$.

On the other hand, the movement of the guide-vane servomotor 8 coupled with the pressure regulator 2 through auxiliary servomotor 3 and the pipe lines 9 is equal to A, and this means that an amount of water corresponding to A flows through the guide vanes to the water wheel. When it is assumed that the amounts of water flowing through the guide vanes and the pressure regulating valve 1 at the time of their 100% opening are equal to each other, the sum of the amounts of water flowing through the water wheel and the pressure regulating valve is maintained at a value corresponding to C, and hence the pressure rise in the penstock can be minimized.

According to the present invention, the load-limiting operation and the governor controlled free-running of the water wheel are thus made possible. Furthermore, because the auxiliary servomotor 8 are connected together through the pipe lines, and the open-or-closing period of the guide vanes is set by the narrowed portions for the main distribution valve 10 at about 10-times longer than that of the pressure regulator 2, the guide vanes can surely cooperate with the pressure regulator 2 regardless of the quick open-or-closing operation of the pressure regulator 2 and of any possible failure of the guide-vane main distribution valve 10. For this reason, the delay time of the operation of the guide vanes from that of the pressure regulator 2 can be minimized, and the pressure rise in the penstock can be surely suppressed to a minimum value.

What is claimed is:

1. Apparatus for controlling the flow control guide vanes of a penstock which directs the water flow to a water wheel power generating device, wherein said guide vanes are movable between an open and a closed position, and having a pressure regulating device to control the water pressure in said penstock comprising;
    a. a first actuating means connected to said guide vanes to selectively move said vanes between an open and a closed position,
    b. a second acutating means connected to said pressure regulating device to selectively regulate the pressure in said penstock,
    c. a third actuating means connected to said second actuating means and said first actuating means,
    d. means to control said first and second actuating means in response to the load or speed of said water wheel, and
    e. linkage means interconnecting said first actuating means and said second actuating means with each other and with said control means such that when the speed of closing said guide vanes exceeds a predetermined level, said pressure regulating device is opened to reduce the pressure build up in said penstock.

2. The apparatus of claim 1 wherein said first actuating means comprises,
    a. an hydraulic servomotor including mechanically connected to said guide vanes to open and close said vanes,
    b. a control valve hydraulically connected to said hydraulic servomotor to control the movement thereof and mechanically connected to said linkage means, and
    c. conduit means interconnecting said hydraulic servomotor with said third actuating means.

3. The apparatus of claim 2 wherein the mechanical connection between the hydraulic servomotor and the guide vanes is further connected to said linkage means.

4. The apparatus of claim 1 wherein said second actuating means comprises;
    a. an hydraulic servomotor mechanically connected to said pressure regulating device,
    b. a distribution valve hydraulically connected to said hydraulic servomotor to control the movement of said hydraulic servomotor, and mechanically connected to said linkage means.

5. The apparatus of claim 4 wherein the mechanical connection between the hydraulic servomotor and the pressure regulating device is further connected to said linkage means.

6. The apparatus of claim 1 wherein said third actuating means comprises an hydraulic servomotor mechanically connected to said second actuating means and hydraulically connected to said first actuating means.

7. The apparatus of claim 1 wherein said control means comprises;
   a. a load limiting device for controlling the load placed on said water wheel,
   b. a speed sensing device to sense the rotational speed of said water wheel,
   c. a governor auxiliary hydraulic servomotor having its output shaft mechanically connected to said linkage means, and
   d. a primary distribution valve mechanically connected to said load limiting device and said speed sensing device and hydraulically connected to said governor auxiliary hydraulic servomotor to control the position of said governor auxiliary servomotor in response to the outputs of the load limiting and speed sensing devices.

8. A method of controlling the flow of water through a penstock to a water wheel power generating device comprisig the steps of:
   a. sensing the speed of rotation of said water wheel,
   b. actuating a governor auxiliary servomotor in response to the speed of rotation of said water wheel,
   c. detecting the set position of a load limiting device,
   d. actuating a pressure regulator by the difference between the position of said governor auxiliary servomotor and the position of a guide vanes servomotor, and
   e. actuating guide vanes by the difference between the position of said pressure regulator and the set position of load limiting device.

* * * * *